July 1, 1924.

J. W. HENDERSON 1,499,530

TRUCK

Filed April 17, 1923    2 Sheets-Sheet 2

WITNESSES
M. W. Fowler

INVENTOR
John W. Henderson

ATTORNEYS

Patented July 1, 1924.

1,499,530

UNITED STATES PATENT OFFICE.

JOHN WIMBISH HENDERSON, OF TUNICA, MISSISSIPPI.

TRUCK.

Application filed April 17, 1923. Serial No. 632,735.

*To all whom it may concern:*

Be it known that I, JOHN W. HENDERSON, a citizen of the United States, and resident of Tunica, in the county of Tunica and State of Mississippi, have invented certain new and useful Improvements in Trucks, of which the following is a specification.

This invention relates to trucks especially adapted for use in handling express matter or freight and more specifically the invention is designed to facilitate the movement of the express matter or freight from a car to the depot and from the depot to the car to reduce the time necessary for the train to wait to a minimum.

Further the invention aims to provide a truck of the character specified which is of highly simplified construction, durable in use and cheap to manufacture.

Other objects and advantages will be apparent during the course of the following description.

In the accompanying drawing forming a part of this application and in which like numerals are employed to designate like parts throughout the same.

Figure 1:
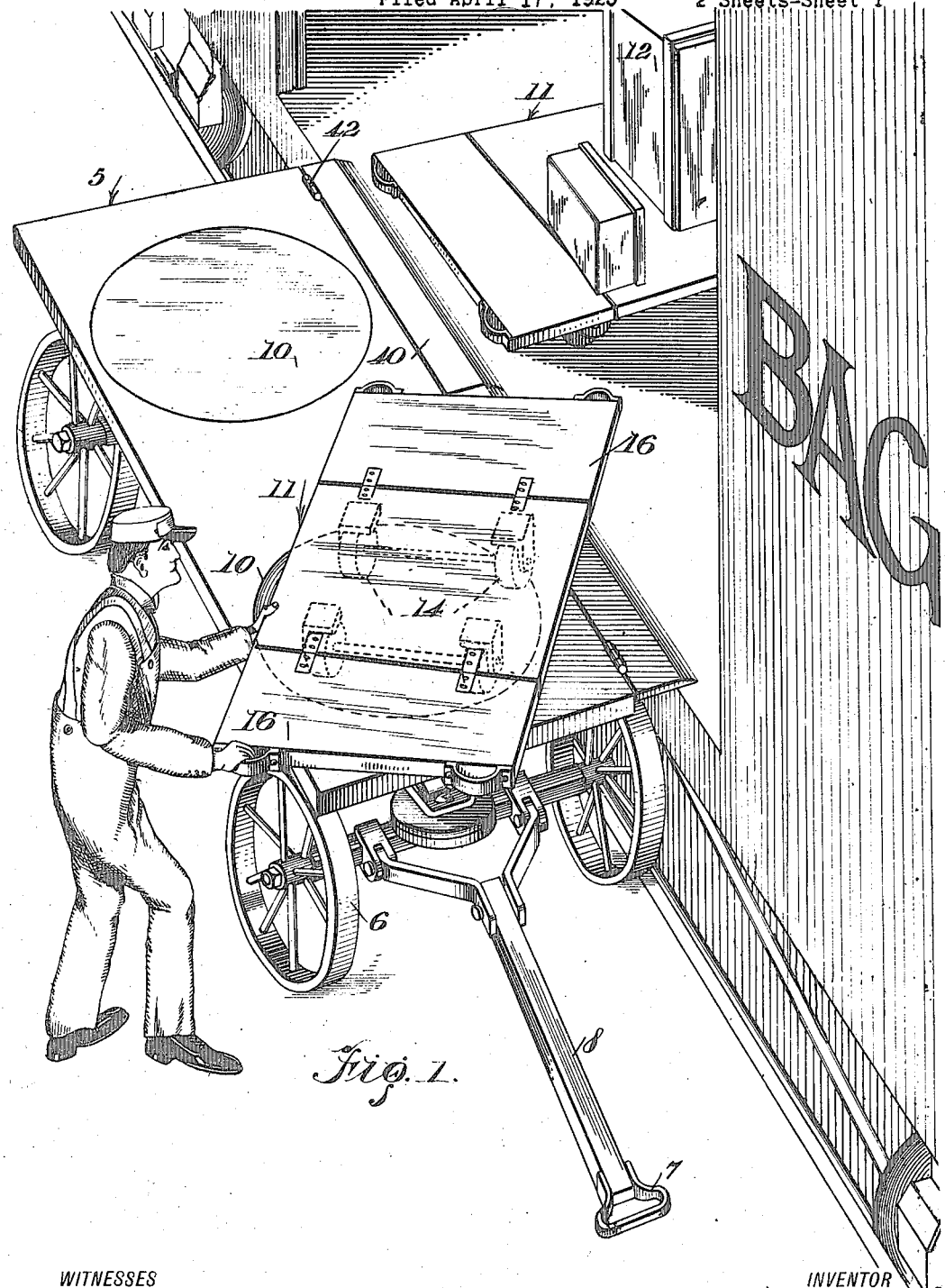
Figure 1 is a perspective illustrating the improved truck for freight handling apparatus in use.

In the drawing wherein for the purpose of illustration is shown a preferred embodiment of the invention, the numeral 5 generally designates the top or platform of what might be said to be the main truck of this invention and which is mounted upon wheels 6. The improved truck may be operated by an expressman or the like who may grasp the handle 7 of a tongue 8. However, the truck may be motor operated without in any way departing from the spirit of the invention.

As previously stated the object of this invention is to provide means to facilitate the loading and unloading of baggage, freight or express and in carrying out the invention the top of the truck is provided with a pair of turntables 10 arranged in spaced relation to each other and to the sides and ends of the truck.

The turntables 10 are adapted to rotatably support auxiliary trucks 11 upon which the baggage, freight or the like designated by the numeral 12 may be loaded. It might be stated that the auxiliary truck 11 is loaded during the travel of the car 14 and when a station is reached the main truck 5 is drawn along the side of the car 14 as illustrated in Figure 1 so that the auxiliary truck and the load thereon may be expeditiously placed on the main truck.

Also the articles to be loaded onto the car are placed on the second auxiliary truck 11 previously mounted on the main truck and when the train arrives at a station the auxiliary truck having the baggage to be loaded onto the car is moved from one of the turntables 10 onto the floor of the baggage car, freight car or the like. During the movement of the main truck from the depot to the car the truck 11 is extended longitudinally of the main truck nd when the main truck is positioned as illustrated in Figure 1 the auxiliary truck is moved at right angles to the main truck and then moved onto the car. This is made possible by turning the truck and the turntable 10 which supports the truck.

When the truck 11, originally carried by the baggage car 14, is loaded it is drawn onto one of the turntables 10 and the main truck 5 is then returned to the depot.

It will be seen that the time required to load and unload the baggage is greatly reduced and it is not necessary to handle individual articles. The saving of from one to three minutes may be effected by this method of loading and unloading freight, baggage and the like.

In carrying out the invention the auxiliary truck 11 is provided at its ends with hinged extensions 16 which may be supported in their approximately horizontal positions by means of the hinges 18 and the brackets 20.

Figure 4:
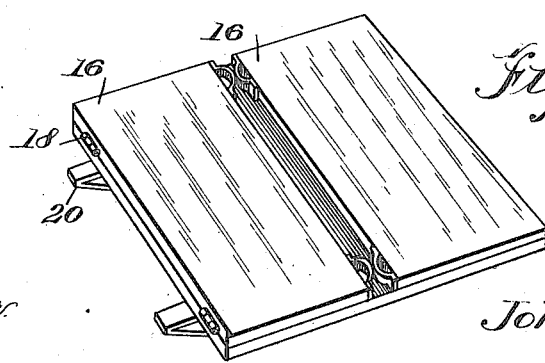
Figure 4 is a perspective of the auxiliary truck folded or collapsed so as to occupy but a small amount of space.

When the auxiliary truck is not in use the extensions 16 may be folded onto the top of the truck as illustrated in Figure 4.

Figure 2:
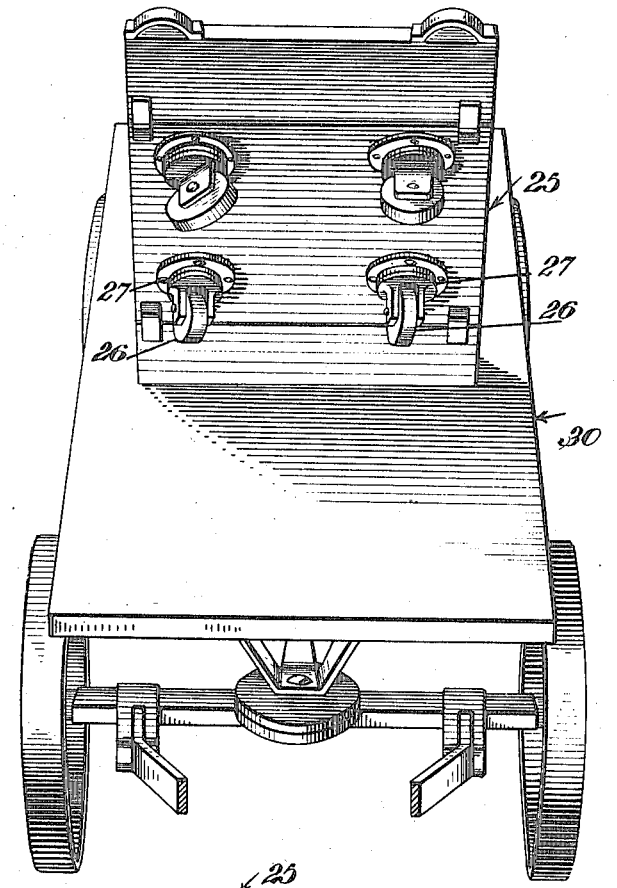
Figure 2 is a perspective of the hauling apparatus equipped with a slightly modified form of auxiliary truck.
Figure 3:
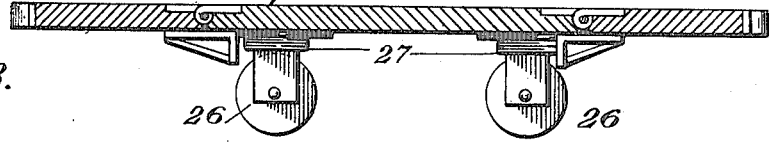
Figure 3 is a longitudinal sectional view through the auxiliary truck.

In the form of the invention illustrated in Figure 2, the auxiliary truck 25 may be provided with casters 26 rotatably supported as indicated at 27 so that it is not necessary to provide turn tables on the main truck designated in Figure 2 by the numeral 30.

It will be seen that the casters 26 and the means to rotatably support the same permit the auxiliary trucks to be conveniently turned around as the occasion requires.

Attention is directed to the fact that the top or platform of the main truck 5 is of the same height as the floor of the car and a leaf 40 is hinged as indicated at 42 to the longitudinal edge of the top and is adapted to overlie the floor of the car so as to permit the auxiliary trucks to be conveniently loaded and unloaded.

It is believed to be obvious from the foregoing description that each station or stop along the route of the express car is provided with one or more of the auxiliary truck and that each station is prepared to receive the loaded truck from the express car when it arrives at the station. In this manner the car as it stops at each station merely exchanges trucks so that it is not necessary to carry a stock of trucks on the car.

Attention is especially directed to the fact that the leaf 40 is divided in the middle and therefore consists of two separate and independent sections which may be swung into the position illustrated in Fig. 1, or which may be separately engaged with the floor of the car or the platform of the station. This allows the main truck to be moved so that it is only partly opposite the door and in that case, the section not in use may be folded up. In the event of it being necessary to move the main truck, preparatory to loading the same with the auxiliary truck and contents, one of the sections of the leaf 40 may be folded up and the other one arranged in the operative position. This overcomes the necessity of having the auxiliary truck exactly in position for the purpose of loading and unloading the main truck.

Having thus described the invention, what is claimed is:—

1. In combination with a main truck provided with turntables of an auxiliary truck adapted to rotate thereon, said auxiliary truck having a folding platform, the central portion thereof being provided with rollers and the end portions being hingedly connected to the central portion and adapted to fold thereupon in the manner described.

2. A loading and unloading apparatus comprising a main truck having a platform provided with a pair of turntables, and auxiliary trucks adapted to rest on said turn tables and having articles supporting means, and a leaf hinged to one longitudinal side of the main truck and adapted to overlap and rest on a surface onto which the auxiliary trucks are to be moved.

3. The combination with a main truck having a platform provided with a pair of turn tables, of auxiliary trucks having article supporting means and provided with wheels adapted to rest upon said turn table, one of said auxiliary trucks being adapted for loading purposes and the other of said auxiliary trucks being adapted for unloading purposes.

JOHN WIMBISH HENDERSON.